G. CUTHBERT.
VARIABLE SPEED TRANSMISSION MECHANISM.
APPLICATION FILED NOV. 23, 1909.
980,210.
Patented Jan. 3, 1911.
2 SHEETS—SHEET 1.
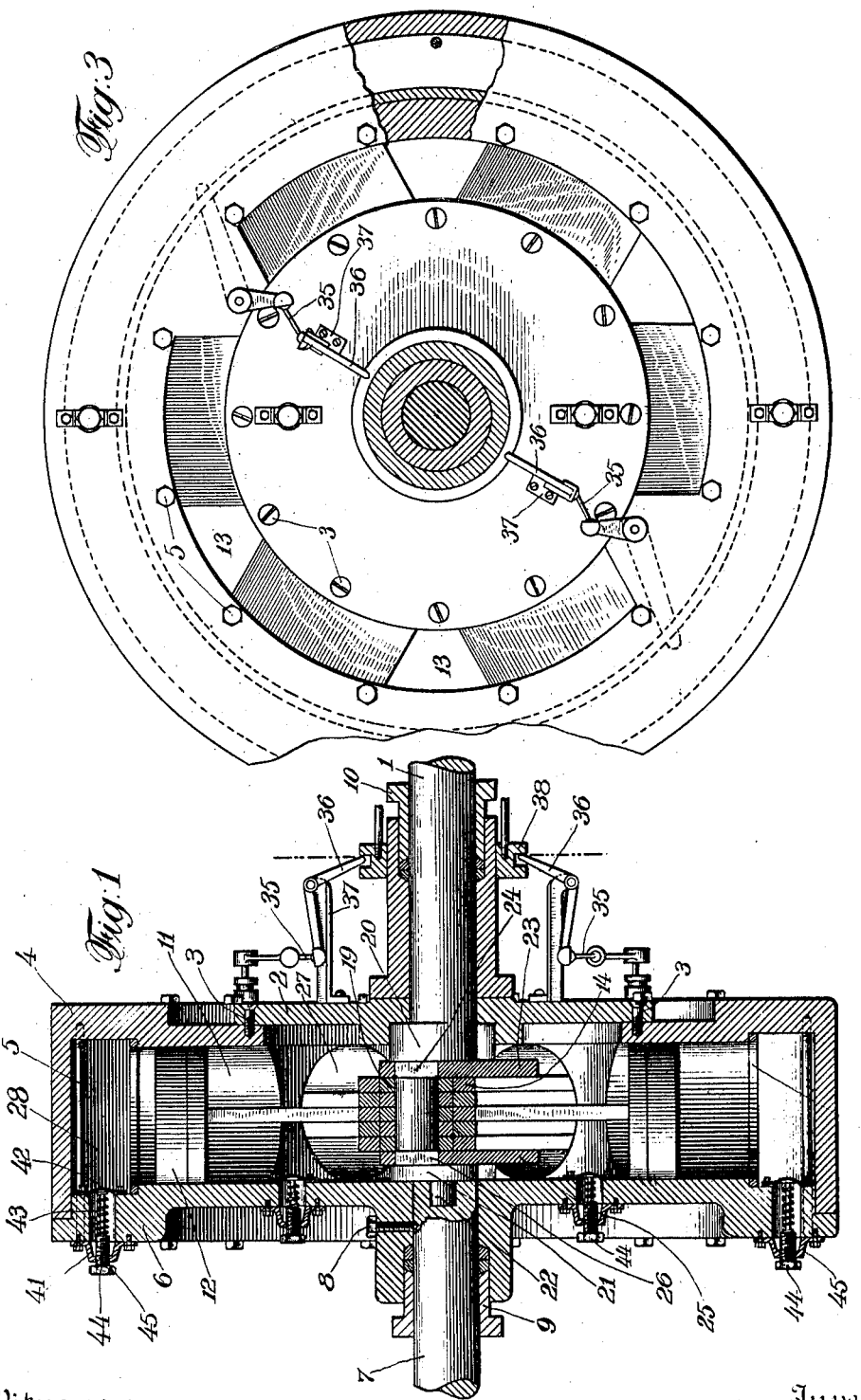

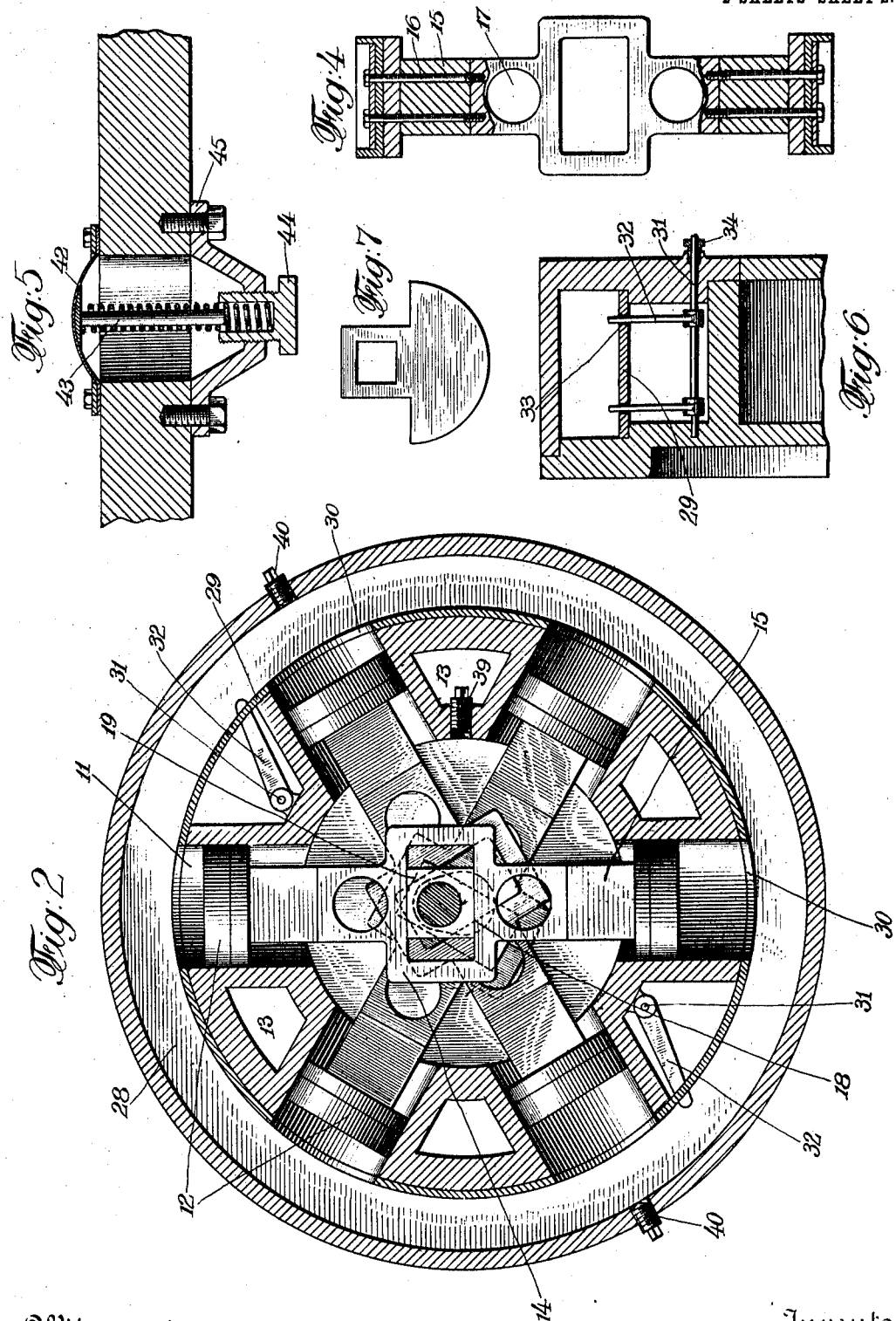

UNITED STATES PATENT OFFICE.

GEORGE CUTHBERT, OF PHILADELPHIA, PENNSYLVANIA, ASSIGNOR OF ONE-HALF TO FRANCIS J. FEE, OF PHILADELPHIA, PENNSYLVANIA.

VARIABLE-SPEED TRANSMISSION MECHANISM.

980,210.  Specification of Letters Patent.  Patented Jan. 3, 1911.

Application filed November 23, 1909. Serial No. 529,574.

*To all whom it may concern:*

Be it known that I, GEORGE CUTHBERT, of Philadelphia, in the county of Philadelphia, and in the State of Pennsylvania, have invented a certain new and useful Improvement in Variable-Speed Transmission Mechanism, and do hereby declare that the following is a full, clear, and exact description thereof.

The object of my invention is to provide a variable speed transmission mechanism which is intended to be substituted for the fly-wheel and the gear mechanism, used for obtaining variable speeds, now in use.

My invention is especially applicable to automobiles, but may be used in connection with any other type of motor mechanism desired.

By means of my invention a variable speed transmission device is provided which is capable of variation from a position of rest to any speed whatever, up to the maximum. By means of my invention I have secured many other useful and desirable results, the nature of which is disclosed hereinafter in connection with the description of the details of the device.

I have shown one embodiment of my invention in the accompanying drawings, in which—

Figure 1 is a vertical section of the mechanism; Fig. 2 is another vertical section thereof, taken at right-angles to the section shown in Fig. 1; Fig. 3 is a vertical side elevation, partly in section, of the apparatus; Fig. 4 is a detail, partly in section, of a pair of pistons used in the apparatus; Fig. 5 is a detail view of one of the pressure equalizing devices; Fig. 6 is a detail view of the valve-operating mechanism; and Fig. 7 is a plan view of one of the counter-balances.

In the drawings, 1 is a driving shaft connected with any suitable motor, such, for example, as a gasolene explosive motor used in an automobile. The end of the shaft 1 supports the casing for receiving the variable speed transmission mechanism. This casing comprises a plate 2 supported directly upon the shaft 1, said plate 2 being secured by means of screws 3 to a cylindrical shell 4, which, in turn, is secured by means of screws 5 to a plate 6 supported upon the inner end of a driven shaft 7. It is intended that the casing be rotated with the driven shaft 7, and for this reason the plate 6 is provided with a screw 8, which passes into the body of the driven shaft 7. Between the plate 6 and the shaft 7 there is located a stuffing box 9 to prevent the escape of any oil from the apparatus. In a similar manner a stuffing box 10 is provided upon the shaft 1 to prevent the escape of oil around the same. The plate 6 is constructed with a series of six radiating cylinders 11 to receive three pairs of pistons 12. Between the cylinders 11 the plate 6 is constructed with transverse apertures 13 to permit the passage of air to cool the apparatus while in use. One pair of the pistons 12 is provided with a connecting rod mechanism, which comprises a central yoke 14 attached to the said pistons by means of spacing blocks 15 and screws 16 passing from the faces of the pistons through said spacing blocks and into the body of the yoke 14. The weight of the connecting rod mechanism is reduced by making circular openings 17 in the yoke 14. The connecting rod mechanism for this pair of pistons is located in the center of the casing of the variable speed transmission mechanism. Another pair of opposing pistons in the casing is connected together in a similar manner by means of a pair of such connecting rod mechanisms already described, said pair of connecting rod mechanisms being located on the opposite sides of said single connecting rod mechanism. In a similar manner the remaining pair of pistons is connected together by means of a pair of connecting rod mechanisms, which are located outside of and adjacent to the remaining connecting rod mechanisms already described. Each of the yokes 14 coöperates with a separate slide block 18, which is loosely carried by a cylindrical portion of a crank pin 19 attached at one end to the crank 20, carried by the inner end of the driving shaft 1, and connected at its other end with a crank 21 supported upon a journal 22 received by the inner end of the driven shaft 7. A counter-balance 23 is located upon a squared portion 24 projecting from the crank 20, and a similar counter-balance 25 is supported upon a squared projection 26 located upon the inner end of the crank 21.

It will be seen that by this arrangement the casing containing the variable speed transmission mechanism is divided into an inner chamber 27 and an outer chamber 28. These chambers are designed to be filled with liquids, the purpose of the liquid located in the inner chamber 27 being to prevent any leakage into the same from the outer chamber 28, and the liquid in the outer chamber 28 being provided for reducing the speed to any extent desired of the various pistons 12 in the cylinders 11. The liquid which I use for this purpose may be of any desired character, but I preferably use oil or glycerin or a mixture of the two. An oil which may be used to advantage for this purpose is cylinder oil. In order to restrict the flow of the body of oil, assuming oil to be the liquid used, in the outer chamber 28 I provide a valve-mechanism which comprises a circular plate 29, said plate being provided with six circular apertures 30, adapted to register, in a certain position of the plate, with the cylinders 11. The plate 29 is designed to be moved so as to move the apertures 30 out of registry with the cylinders 11, and for accomplishing this purpose, I provide at diametrically-opposite sides of the casing shafts 31 each carrying a pair of lever arms 32, the ends of which pass into apertures 33 provided in the band 29. The shafts 31 are journaled at one end in the plate 6, and pass outwardly at the other end through the cylindrical shell 4, stuffing boxes 34 being provided for preventing the escape of any oil around the shafts 31. The shafts 31 are rotated so as to move the apertures 30 out of registry with the cylinders 11 to any extent desired by means of links 35, which are connected to bell-crank levers 36 carried by journal brackets 37 projecting from the plate 2. The ends of the bell-crank levers 36 are operated by means of a slidable sleeve 38, which, in turn, is moved in any suitable manner by means of a manually-operated lever not shown, located in proximity to the motor mechanism.

In order to permit the inner and outer chambers 27 and 28 to be filled with oil, screw-plugs 39 and 40 are provided in apertures leading into the same. The location of these plugs is such as to prevent the formation of an air trap during the filling operation.

As a certain amount of expansion and contraction, due to heat and cold, is unavoidable in the liquids present in the chambers 27 and 28, I locate adjacent to both of said chambers a pressure equalizer or regulator 41. Each of these pressure equalizers or regulators comprises a flexible diaphragm 42 carried upon the inner face of the plate 6, a spring-pressed plunger 43 coöperating with the rear face of said diaphragm, an adjustable screw-threaded plug 44 for receiving the other end of the spring-pressed plunger 43, and a yoke 45 carried by the outer face of the plate 6 for supporting in position the screw-threaded plug 44.

In the operation of the mechanism, the driving shaft 1 being operated at a given speed by means of the motor, power is conveyed therefrom through the connecting rod mechanisms to the six pistons 12 operating in the cylinders 11. Assuming that the apertures 30 are in registry with the cylinders 11, as shown in Fig. 2, the pistons 12 will be moved back and forth by the rotation of the shaft 1, without causing the casing of the variable speed transmission mechanism, which is attached to the driven shaft 7, to be moved to any degree whatsoever. In this position of the parts, if the variable speed transmission mechanism is applied to an automobile, the latter will remain absolutely stationary during the operation of the motor. If now it is desired to convey power from the driving shaft 1 to the driven shaft 7, the sleeve 38 is moved by means of a manually-operated lever attached thereto, so as to cause the apertures 30 to be moved partly or entirely out of registry with the cylinders 11. When the band 29, carrying the apertures 30, has been moved, the oil which has found its way into the cylinders 11 in front of the pistons 12 is, to some extent, retarded from escaping therefrom. In other words, the speed at which the oil so contained in the cylinders 11 is forced therefrom into the outer chamber 28 is controlled by the position of the apertures 30. By this means any desired speed up to a given maximum can be conveyed from the driving shaft 1 to the driven shaft 7. If it is desired to drive the driven shaft 7 at exactly the same speed as the driving shaft 1, the apertures 30 are moved entirely out of registry with the cylinders 11. During the operation of the device in this manner no oil can leak past the pistons 12 from the outer chamber 28 to the inner chamber 27, inasmuch as the latter chamber is already filled with a similar body of oil. Should any leakage at all occur from the outer chamber 28 to the inner chamber during the time that a body of oil is being expelled from one of the cylinders 11, a similar amount of oil will leak from the inner chamber 27 past the opposite piston 12 to the outer chamber 28. Any leakage, therefore, which might by any possibility occur in the operation of the device is equalized, so that the bodies of oil in the two chambers 27 and 28 remain constant in quantity.

The arrangement which I have shown and described is especially advantageous in preventing any loss of power due to friction of the body of liquid against the casing, as the exterior chamber 28 is very large in cross-section. Because of the large size of the apertures 30, it is also possible to maintain the driven shaft 7 at rest when said apertures are in registry with the cylinders 11. Were these apertures very small in size, it would be practically impossible to maintain said driven shaft at rest, even when the apertures were open to their fullest extent.

Should any expansion or contraction in the bodies of oil occur, due to a change in the temperature, this expansion is taken care of by a corresponding movement of the diaphragms 42 of the pressure equalizing or regulating devices. Any possibility of the formation of spaces in the chambers 27 and 28 not filled with liquid but filled with a gas of some kind, is thereby avoided.

The variable speed transmission mechanism also operates perfectly as a fly-wheel, inasmuch as the weight of the parts is sufficient, and as the presence of the counterbalances 23 and 25 causes the center of gravity to be retained at all times at the centers of the supporting shafts. Furthermore, in the operation of the device, every opportunity is given for preventing any rise in temperature which might be due, either to the friction of the parts, or due to conduction from the heat of the motor mechanism by the presence of the openings 13 which pass through the apparatus transversely, in a manner similar to the openings between the spokes of a wheel.

While I have described my invention above in detail, I wish it to be understood that many changes may be made therein without departing from the spirit of my invention.

I claim:—

1. In a variable speed transmission mechanism, one or more cylinders, one or more pistons therefor, a body of liquid coöperating therewith, and a pressure regulator for permitting the expansion and contraction of the body of liquid, said pressure regulator comprising a flexible diaphragm and a coiled spring for pressing the same inwardly.

2. In a variable speed transmission mechanism, one or more cylinders, one or more pistons therefor, a body of liquid adapted to be admitted to and expelled from said cylinders, and a valve mechanism having apertures for controlling the flow of the liquid at least as large as the cross-sectional areas of the cylinders.

3. In a variable speed transmission mechanism, a series of cylinders arranged in a circle, a series of pistons therefor, a body of liquid adapted to be admitted to and expelled from said cylinders, and a valve band having apertures adapted to control the access of the body of liquid to said cylinders.

4. In a variable speed transmission mechanism, one or more cylinders, one or more pistons therefor, a driving shaft connected to one of said elements, a driven shaft connected to the other, and a counterbalance for balancing the eccentricity of the position of the piston or pistons.

5. In a device of the character described, a pair of opposed cylinders, and a pair of pistons therefor, said pistons being connected together by a yoke, and thin flat spacing blocks located between the yoke and the piston to permit the parts to be readily dismantled.

6. In a device of the character described, a pair of opposed cylinders, and a pair of pistons therefor, said pistons being connected together by a yoke, thin flat spacing blocks to permit the parts to be readily dismantled, and screws passing from the pistons through the blocks and into the yoke.

In testimony that I claim the foregoing I have hereunto set my hand.

GEORGE CUTHBERT.

Witnesses:
 N. N. RANDALL,
 JOHN D. RICHARDSON.